United States Patent
Kennedy et al.

(10) Patent No.: US 11,044,271 B1
(45) Date of Patent: Jun. 22, 2021

(54) AUTOMATIC ADAPTIVE POLICY BASED SECURITY

(71) Applicant: NortonLifeLock Inc., Tempe, AZ (US)

(72) Inventors: Mark Kennedy, Gardena, CA (US); Petrus Johannes Viljoen, Manhattan Beach, CA (US)

(73) Assignee: NortonLifeLock Inc., Tempe, AZ (US)

( * ) Notice: Subject to any disclaimer, the term of this patent is extended or adjusted under 35 U.S.C. 154(b) by 335 days.

(21) Appl. No.: 15/921,923

(22) Filed: Mar. 15, 2018

(51) Int. Cl.
*H04L 29/06* (2006.01)
*H04L 29/08* (2006.01)

(52) U.S. Cl.
CPC .......... *H04L 63/20* (2013.01); *H04L 63/1408* (2013.01); *H04L 63/1441* (2013.01); *H04L 67/22* (2013.01)

(58) Field of Classification Search
CPC .................. H04L 63/20; H04L 63/1408; H04L 63/1441; H04L 67/22
USPC ............................................................. 726/1
See application file for complete search history.

(56) References Cited

U.S. PATENT DOCUMENTS

| | | | | |
|---|---|---|---|---|
| 6,226,372 B1* | 5/2001 | Beebe | ................. | H04L 63/0218 379/145 |
| 6,463,470 B1* | 10/2002 | Mohaban | ............ | H04L 41/0893 709/223 |
| 6,587,113 B1* | 7/2003 | Baldwin | ................... | G06T 1/60 345/552 |
| 6,654,895 B1* | 11/2003 | Henkhaus | ............. | G06F 1/3203 710/18 |
| 8,205,239 B1* | 6/2012 | Satish | ................... | H04L 63/126 726/1 |
| 8,490,163 B1* | 7/2013 | Harsell | ............... | G06F 21/6236 726/6 |
| 8,893,293 B1* | 11/2014 | Schmoyer | ........... | H04L 63/0807 726/26 |
| 9,641,544 B1* | 5/2017 | Treat | ................... | H04L 63/1425 |
| 9,922,191 B1* | 3/2018 | Grafi | ........................ | H04L 9/30 |

(Continued)

OTHER PUBLICATIONS

Atighetchl. "Dynamic cross domain information sharing: a concept paper on flexible adaptive policy management." In Proceedings of the 3rd ACM workshop on Assurable and usable security configuration, pp. 83-88. 2010. (Year: 2010).*

(Continued)

*Primary Examiner* — Luu T Pham
*Assistant Examiner* — Walter J Malinowski
(74) *Attorney, Agent, or Firm* — Holland & Hart LLP

(57) ABSTRACT

A method for implementing adaptive policy based computer security is described. In one embodiment, the method may include monitoring a behavior of a user on a computing device associated with the user, determining whether the user triggers one or more policy triggers associated with a broad policy or at least one sub-policy of the broad policy, or both, and upon determining the user triggers at least one policy trigger during the monitoring period, implementing a customized version of the broad policy on the computing device. In some cases, the method may include implementing the broad policy on the computing device upon determining the user does not trigger any of the one or more policy triggers. In other cases, the method may include triggering at least one of the policy triggers based at least in part on a requested action and determining whether the requested action includes a security threat.

16 Claims, 8 Drawing Sheets

(56) References Cited

U.S. PATENT DOCUMENTS

| | | | |
|---|---|---|---|
| 10,555,145 B1* | 2/2020 | Siddiqui | H04L 41/0893 |
| 2004/0193912 A1* | 9/2004 | Li | G06F 21/55 |
| | | | 726/14 |
| 2005/0053046 A1* | 3/2005 | Wang | H04L 12/4645 |
| | | | 370/338 |
| 2005/0091505 A1* | 4/2005 | Riley | H04L 47/781 |
| | | | 713/182 |
| 2006/0212574 A1* | 9/2006 | Maes | H04L 63/102 |
| | | | 709/226 |
| 2007/0055619 A1* | 3/2007 | Abrahams | G06Q 40/02 |
| | | | 705/38 |
| 2008/0052757 A1* | 2/2008 | Gulati | H04L 41/082 |
| | | | 726/1 |
| 2008/0201339 A1* | 8/2008 | McGrew | G06F 16/2445 |
| 2009/0328219 A1* | 12/2009 | Narayanaswamy | |
| | | | H04L 63/1425 |
| | | | 726/23 |
| 2010/0162347 A1* | 6/2010 | Barile | G06F 21/552 |
| | | | 726/1 |
| 2010/0274796 A1* | 10/2010 | Beauregard | H04L 12/1822 |
| | | | 707/769 |
| 2010/0332504 A1* | 12/2010 | Brucker | G06F 21/6218 |
| | | | 707/759 |
| 2011/0078375 A1* | 3/2011 | Shepherd | G06F 12/0866 |
| | | | 711/115 |
| 2012/0039175 A1* | 2/2012 | Sridhar | H04L 47/125 |
| | | | 370/236 |
| 2013/0055343 A1* | 2/2013 | de los Reyes | H04L 63/1416 |
| | | | 726/1 |
| 2013/0074191 A1* | 3/2013 | Ben-Reuven | G06F 21/6209 |
| | | | 726/26 |
| 2013/0246925 A1* | 9/2013 | Ahuja | H04L 63/1416 |
| | | | 715/738 |
| 2013/0263206 A1* | 10/2013 | Nefedov | G06F 21/6245 |
| | | | 726/1 |
| 2014/0026182 A1* | 1/2014 | Pearl | G06Q 10/103 |
| | | | 726/1 |
| 2014/0089782 A1* | 3/2014 | Cook | G06F 16/957 |
| | | | 715/234 |
| 2015/0082372 A1* | 3/2015 | Kottahachchi | G06F 21/604 |
| | | | 726/1 |
| 2015/0089582 A1* | 3/2015 | Dilley | H04L 63/0263 |
| | | | 726/1 |
| 2015/0223071 A1* | 8/2015 | Raleigh | H04L 41/5006 |
| | | | 726/1 |
| 2016/0014159 A1* | 1/2016 | Schrecker | H04L 63/0869 |
| | | | 726/1 |
| 2016/0078203 A1* | 3/2016 | Moloian | H04L 63/101 |
| | | | 726/17 |
| 2016/0088011 A1* | 3/2016 | Johri | G06F 21/52 |
| | | | 726/23 |
| 2016/0162953 A1* | 6/2016 | Tang | G06Q 30/0269 |
| | | | 705/14.66 |
| 2016/0180093 A1* | 6/2016 | Goss | G06F 21/57 |
| | | | 726/1 |
| 2016/0335685 A1* | 11/2016 | Rehman | G06Q 30/0601 |
| 2017/0250868 A1* | 8/2017 | Keeney | H04L 41/0816 |
| 2017/0318027 A1* | 11/2017 | Rodniansky | H04L 63/1425 |
| 2017/0339178 A1* | 11/2017 | Mahaffey | G06F 11/3006 |
| 2018/0027006 A1* | 1/2018 | Zimmermann | H04L 63/0227 |
| | | | 726/11 |
| 2018/0060584 A1* | 3/2018 | Ahuwanya | G06F 21/566 |
| 2018/0084010 A1* | 3/2018 | Joseph | H04L 63/20 |
| 2018/0084012 A1* | 3/2018 | Joseph | H04L 63/1425 |
| 2018/0285777 A1* | 10/2018 | Li | H04L 67/22 |
| 2018/0288063 A1* | 10/2018 | Koottayi | H04L 63/102 |
| 2018/0307840 A1* | 10/2018 | David | G06F 21/568 |
| 2019/0036969 A1* | 1/2019 | Swafford | G06F 11/3072 |
| 2019/0087142 A1* | 3/2019 | Pinney | G06F 3/1285 |
| 2019/0124118 A1* | 4/2019 | Swafford | H04L 67/141 |
| 2019/0132352 A1* | 5/2019 | Zhang | H04L 63/1441 |
| 2019/0253503 A1* | 8/2019 | Austin | G06F 16/9558 |
| 2019/0259097 A1* | 8/2019 | Raleigh | G06Q 20/0855 |
| 2019/0266205 A1* | 8/2019 | Mohen | H04L 67/306 |

OTHER PUBLICATIONS

Feng. "Adaptive policy trigger mechanism for OBSS." In 19th International Conference on Advanced Information Networking and Applications (AINA'05) vol. 1 (AINA papers), vol. 2, pp. 591-595. IEEE, 2005. (Year: 2005).*

Castiglione, Aniello, Alfredo De Santis, Ugo Fiore, and Francesco Palmieri. "An enhanced firewall scheme for dynamic and adaptive containment of emerging security threats." In 2010 International Conference on Broadband, Wireless Computing, Communication and Applications, pp. 475-481. IEEE, 2010. (Year: 2010).*

Lu, Yiming, Wanxing Sheng, Liu Riliang, and Peipei Jin. "Research and Construction of Dynamic Awareness Security Protection Model Based on Security Policy." In 2017 IEEE International Conference on Smart Cloud (SmartCloud), pp. 202-207. IEEE, 2017. (Year: 2017).*

* cited by examiner

AUTOMATIC ADAPTIVE POLICY BASED SECURITY

BACKGROUND

The use of computer systems and computer-related technologies continues to increase at a rapid pace. The expansive use of computer systems has influenced the advances made to computer-related technologies. Computer systems have increasingly become an integral part of the business world and the activities of individual consumers. Computer systems may be used to carry out several business, industry, and academic endeavors.

The widespread use of computers and mobile devices has caused an increased presence in malicious behavior including data theft, embedding malware and viruses, and the like. Security policies may be configure detect security violations and prevent certain security violations before they can occur.

SUMMARY

According to at least one embodiment, a method for implementing adaptive policy based computer security is described. In one embodiment, the method may include monitoring a behavior of a user on a computing device associated with the user, determining whether the user triggers one or more policy triggers associated with a broad policy or at least one sub-policy of the broad policy, or both, and when the user triggers at least one policy trigger during the monitoring period, implementing a customized version of the broad policy on the computing device. In some cases, the method may include implementing the broad policy on the computing device upon determining the user does not trigger any of the one or more policy triggers. In other cases, the method may include triggering at least one of the policy triggers based at least in part on a requested action and determining whether the requested action includes a security threat.

In some cases when the requested action includes the security threat, the method may include performing a security action. The security action may include implementing the broad policy on the computing device and adding the requested action as a blocked action under the broad policy. Adding the requested action may customize the broad policy to the computing device of the user. In some cases when the requested action includes no security threat, the method may include implementing the broad policy on the computing device and adding the requested action as an allowed action under the implemented broad policy. In some embodiments when the requested action includes no security threat, the method may include classifying the requested action as a false positive of the at least one policy trigger.

In some cases when the requested action includes the security threat, the method may include performing a security action. Performing the security action may include implementing the broad policy on the computing device, generating a notification indicating the security threat, implementing the broad policy on the computing device, and sending the notification to an administrator. In some situations when the requested action includes no security threat, the method may include exonerating the requested action and adding the exonerated action to a global list of allowed actions. In some embodiments when the requested action includes no security threat, the method may include bypassing implementation of the broad policy on the computing device. The customized version of the broad policy may be customized based at least in part on an aspect of at least one policy trigger triggered by the user.

A computing device configured for implementing adaptive policy based computer security is also described. The computing device may include a processor and memory in electronic communication with the processor. The memory may store computer executable instructions that when executed by the processor cause the processor to monitor, during a monitoring period, a behavior of a user on a computing device associated with the user and determine, during the monitoring period, whether the user triggers one or more policy triggers associated with a broad policy or at least one sub-policy of the broad policy, or both. When the user triggers at least one policy trigger during the monitoring period, the computer executable instructions may cause the processor, when executed, to cause the processor to implement a customized version of the broad policy on the computing device. In some cases, the memory may store computer executable instructions that when executed by the processor cause the processor to perform the steps of implementing the broad policy on the computing device upon determining the user does not trigger any of the one or more policy triggers. In some cases, the memory may store computer executable instructions that when executed by the processor cause the processor to perform the steps of triggering at least one of the policy triggers during the monitoring period based at least in part on a requested action and determining whether the requested action includes a security threat.

A non-transitory computer-readable storage medium storing computer executable instructions is also described. When the instructions are executed by a processor, the execution of the instructions may cause the processor to perform the steps of monitoring, during a monitoring period, a behavior of a user on a computing device associated with the user and determining, during the monitoring period, whether the user triggers one or more policy triggers associated with a broad policy or at least one sub-policy of the broad policy, or both. When the user triggers at least one policy trigger during the monitoring period, the computer executable instructions may cause the processor, when executed, to cause the processor to implement a customized version of the broad policy on the computing device. In some cases, the memory may store computer executable instructions that when executed by the processor cause the processor to perform the steps of implementing the broad policy on the computing device upon determining the user does not trigger any of the one or more policy triggers. In some cases, the memory may store computer executable instructions that when executed by the processor cause the processor to perform the steps of triggering at least one of the policy triggers during the monitoring period based at least in part on a requested action and determining whether the requested action includes a security threat.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
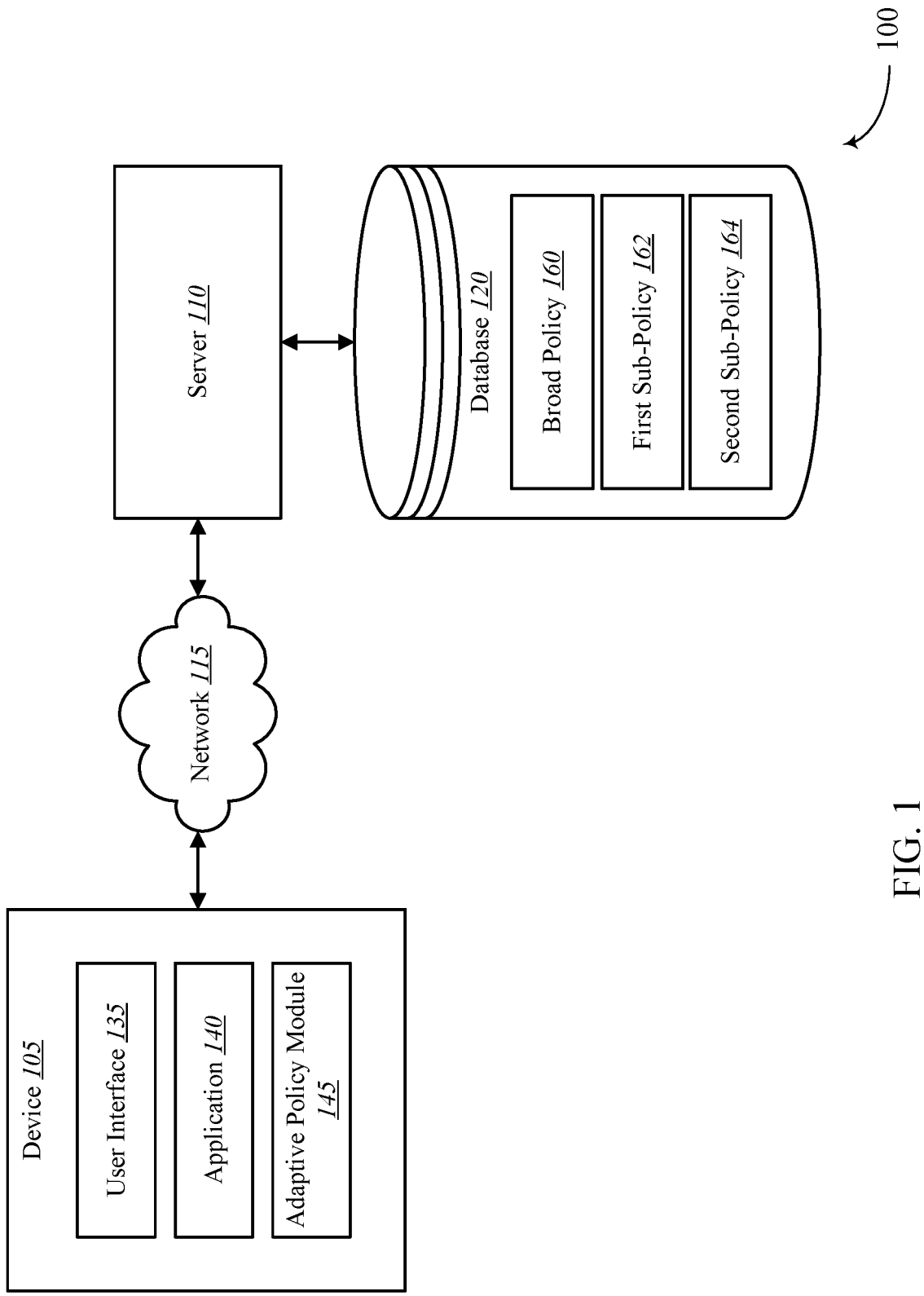
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to adaptive security policies. More specifically, the systems and methods described herein relate to improving security policies by allowing sub-policies of a behavior based system to be triggered and analyzed for exoneration or blocking.

The policy based security policies may include broad policies that are correlated with sub-policies. Examples of broad policies may include that a program cannot use PowerShell, Office documents cannot have macros, a program cannot have standalone scripting, other sub-policies, or combinations thereof. Under these policies, each broad policy may include rules that are targeted on a subset of the larger policy. An example of a sub-policy may include that PowerShell cannot launch active scripting (e.g., JAVASCRIPT®, JSCRIPT®, Perlscript, etc.).

In some cases, the broad policy includes a single layer of sub-policies. In yet other examples, multiple layers of sub-policies are correlated with each other and the broad policy. Thus, a sub-policy may be correlated to its own broader policy, while also being a broader policy to another sub-policy. The principles of this disclosure include hierarchies with different numbers of policy layers. In some cases, there are just two layers, but in other examples, there may be more than two layers of policies. In some embodiments, a first policy associated with a first set of one or more users may have X layers, while a second policy associated with a second set of one or more user may have Y layers, where X and Y are positive integers and where X is different than or equals Y.

A user of a computing device may include an individual operating the computing device or a program that is running on the computing device. The computing device may be monitored during a monitoring period, which is a period of time where the user's behavior is analyzed with respect to the broad policies and the sub-policies. In some cases, just a single broad policy and its associated sub-policies are monitored during the monitoring period. In other examples, the multiple broad policies and their associated sub-policies are monitored simultaneously. In yet other examples, a broad policy is being monitored and the sub-policies are blocking during the monitoring period.

In those situations where the broad policy is not triggered by requested actions of the user, the broad policy may be considered narrow enough not to trigger false positives. In this case, the broad policy may be narrow enough that legitimate actions requested by the user are not blocked, thereby allowing the user full freedom to perform the types of actions that it desires. After the monitoring period, broad policies that are not triggered may be considered safe to implement since the legitimate uses of the program were not prevented during the monitoring period. Thus, when a broad policy is not triggered, the broad policy may be implemented.

In those situations where one broad policy and/or a sub-policy is triggered during the monitoring period, the requested action that triggered the broad policy can be analyzed to determine whether the requested action poses a security threat or is a legitimate request of a user. In those circumstances where the requested action is considered to include a security threat, the requested action can be blocked for further use. The blocked action can be included in a list of actions to be blocked that are included under the broad policy. In some cases, the broad policy can be modified after determining which of the sub-policies are triggered by malicious actions. The modified broad policy can either go through a subsequent monitoring period with sub-policies or, in some cases, be implemented based at least on the data from the initial monitoring period.

In other situations the broad policy and/or a sub-policy may be triggered during the monitoring period, but the requested action may be exonerated instead of being blocked. In this case, the requested action may be classified as a false positive because after analyzing the requested action, the requested action may be determined to have been a legitimate request. In this case, the legitimate request may be added to a list of actions that are to be allowed under the broad policy. The legitimate action may cause the broad policy to be modified after the monitoring period.

This system of modifying the broad policy by blocking malicious actions while permitting the legitimate actions allows for the broad policy to be more flexible and targeted. Thus, the policy can be written to prevent more malicious activity while not being so broad as to block the legitimate actions of the user. The modified broad policy may be constructed from the events that occurred during the monitoring period. In some case, the modifications are made automatically. In one particular example, a machine learning process may be implemented to make the changes to the broad policy.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, database 120, and a network 115 that allows the device 105, the server 110, and database 120 to communicate with one another.

Examples of the device 105 may include any combination of mobile devices, smart phones, personal computing devices, computers, laptops, desktops, servers, media content set top boxes, or any combination thereof. Examples of server 110 may include any combination of a data server, a cloud server, an automation server, proxy server, mail server, web server, application server, database server, communications server, file server, home server, mobile server, name server, or any combination thereof.

In some configurations, the device 105 may include a user interface 135, application 140, and adaptive policy module 145. Although the components of the device 105 are depicted as being internal to the device 105, it is understood that one or more of the components may be external to the device 105 and connect to device 105 through wired and/or wireless connections. In some embodiments, application 140 may be installed on a remote computing device in order to allow a remote user to interface with a function of device 105, adaptive policy module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a classifier ordering module 145. For example, device 105 may include application 140 that allows device 105 to interface with a remote device via adaptive policy module 145 located on another device such as a remote computing device and/or server 110. In some embodiments, device 105 and server 110 may include an adaptive policy module 145 where at least a portion of the functions of adaptive policy module 145 are performed separately and/or concurrently on device 105 and/or server 110. Likewise, in some embodiments, a user may access the functions of device 105 (directly or through device 105 via classifier ordering module 145) from a remote computing device. For example, in some embodiments, a remote computing device includes a mobile application that interfaces with one or more functions of device 105 classifier ordering module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include a broad adaptive policy 160, a first sub-policy 162, and a second sub-policy 164. For example, device 105 may access the broad adaptive policy 160, a first sub-policy 162, and a second sub-policy 164 in database 120 over network 115 via server 110. The broad policy 160 may be correlated with the first sub-policy 162, and the second sub-policy 164, or any other sub-policy. These policies may be triggered by user actions.

Adaptive policy module 145 may enable an improved behavior based implementation of security features that are not overly broad so that users are not blocked from performing legitimate actions. For example, the adaptive policy module may allow the policies to be triggered and evaluated for security threats. In those cases where no security threats are determined, the triggered action may be exonerated and used to modify the broad policy to allow that particular exonerated user action. However, in those cases where a security threat is determined, the requested user action is blocked and included in a list of actions to be blocked in the broad adaptive policy. In some embodiments, the adaptive policy module 145 may be configured to perform the systems and methods described herein in conjunction with user interface 135 and application 140. User interface 135 may enable a user to interact with, control, and/or program one or more functions of adaptive policy module 145. Further details regarding the adaptive policy module 145 are discussed below.

Figure 2:
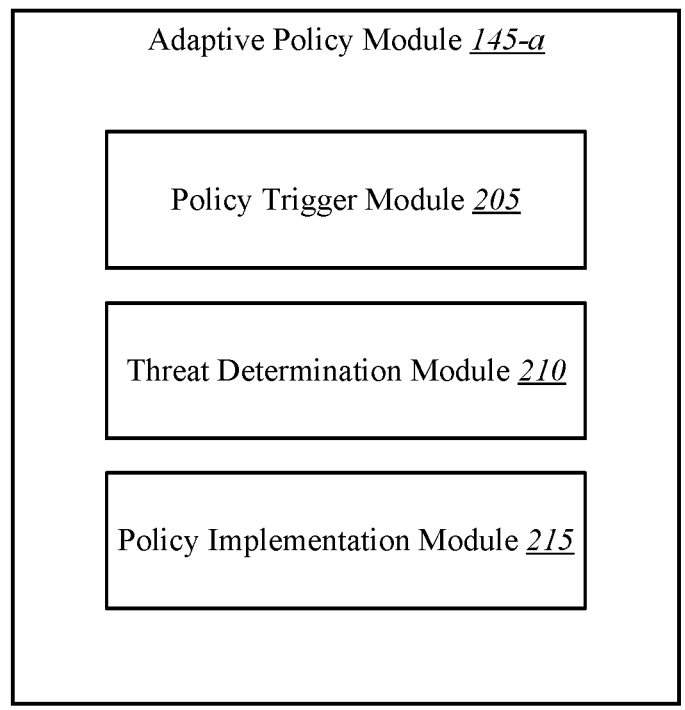
FIG. 2 is a block diagram illustrating one example of an adaptive policy module.

FIG. 2 is a block diagram illustrating one example of an adaptive policy module 145-*a*. The adaptive policy module 145-*a* may be one example of the adaptive policy module 145 depicted in FIG. 1. As depicted, the adaptive policy module 145-*a* may include a policy module 205, a threat determining module 210, and a policy implementation module 215.

The policy trigger module 205 may determine when a policy is triggered. The policy may be a broad policy or a sub-policy. For example, the policy trigger module 205 may detect the behavior of the user that is described in the broad policy or sub-policy. When triggered, the user behavior and/or requested action may be analyzed by the threat determination module 210.

The threat determination module 210 may analyze the requested action and/or the behavior to determine the likelihood that the requested action and/or behavior includes a security threat. In those circumstances where a security threat is determined to exist, the requested action and/or behavior may be classified as being malicious. In those circumstances where the security threat is determined to not exist, the requested action and/or behavior may be classified as being a false positive.

The policy implementation module 215 may implement a policy based on the determination of the requested action and/or behavior being classified as a malicious action or as a false positive. In some cases, the requested action and/or behavior is assigned to a list of allowed actions or blocked actions that can be used to modify the broad policy.

Figure 3:
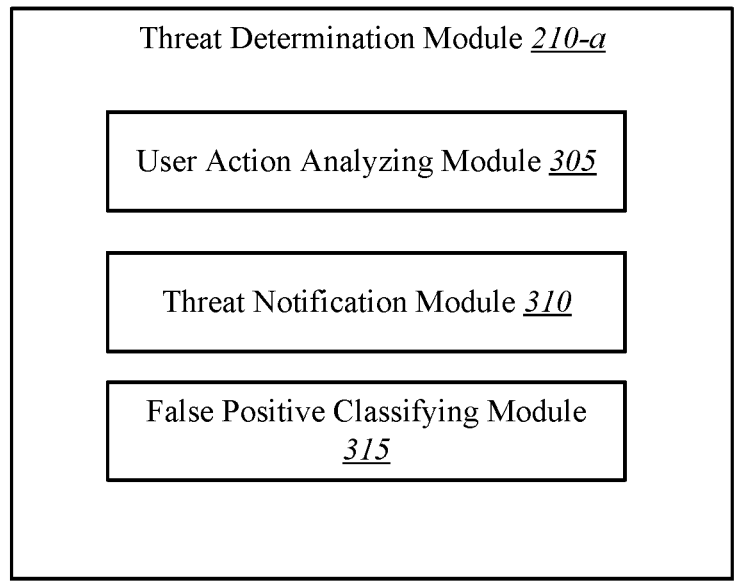
FIG. 3 is a block diagram illustrating one example of a threat determination module.

FIG. 3 is a block diagram illustrating one example of a threat determination module 210-*a*. The threat determination module 210-*a* may be one example of threat determination module 210 depicted in FIG. 2. As depicted, the threat determination module 210-*a* may include a user action analyzing module 305, a threat notification module 310, and false positive classifying module 315.

The user action analyzing module 305 may analyze the actions that are triggered by the broad policy and/or sub-policies to determine whether there is a likelihood of a security threat. The analysis may include weighing factors of whether harm would be caused by the action if not blocked. For example, if vital operating components of the computing device are involved in the requested action, the threat to the security of the computing device may be more likely than if other components of the computing device are involved. Further, if the requested action follows in-line with the intended purpose of a program that is designed for use on the computing device, then the likelihood of the requested action having a security threat may be low. Further, the potential results of the requested action may be analyzed. For example, if the requested action would likely consume the full processing capacity of the computing device for a prolong period of time, then the likelihood that the requested action contains a security threat may be higher. In another example, if the requested action includes requesting access to sensitive information, then the likelihood that the requested action may be higher. In yet another example, if the requested action includes the communication with an untrusted source, then the requested action may have a higher likelihood of having a security threat.

The determined likelihood that a requested action has a security threat may change over time. For example, when a requested action is first requested and triggered by the policy, the requested action may appear to be legitimate. However, if that same action is requested repeatedly so that the possessing capacity of the computing device is reduced or other harmful unintended results occur, the likelihood that the requested action has a perceived security threat may increase over time.

While the exonerated actions may be included on a list of allowed actions, these exonerated actions may not be added to the list until after the monitoring period is over. Thus, in those circumstances where the perceived security threat changes over time, the initially exonerated requested actions, but would otherwise be blocked later actions, are not included on the allowed list until a more full realization of their impact is recognized after the monitoring period.

The threat notification module 310 may generate a notification based at least on when a requested action is determined to have a security threat. This notification can include details about the type of risk that the requested action is perceived to include. The threat notification module 310 may send the notification to an administrator. In some cases, the threat notification module 310 may send the notification to the policy implementation module 215 depicted in FIG. 2.

The false positive classifying module 315 may classify a requested action as a false positive when the requested action is determined to not include a security threat. A notification can be generated about the requested action and the reasons why the requested action has a low likelihood of having a security threat. The false positive classifying module 315 may send the notification to an administrator. In some cases, the false positive classifying module 315 may send the notification to the policy implementation module 215 depicted in FIG. 2.

Figure 4:
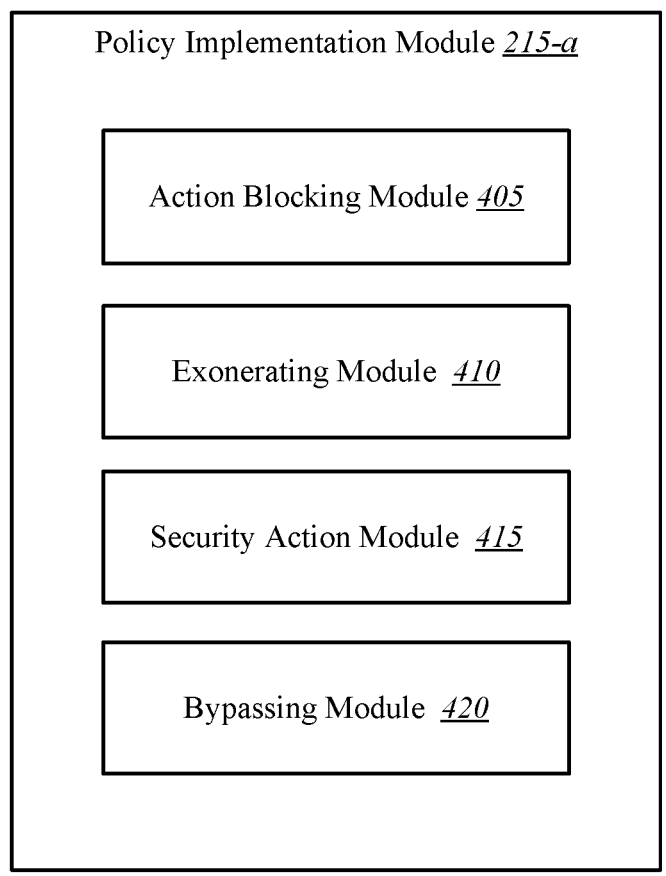
FIG. 4 is a block diagram illustrating one example of a policy implementation module.

FIG. 4 is a block diagram illustrating one example of a policy implementation module 215-a. The policy implementation module 210-a may be one example of the policy implementation module 215 depicted in FIG. 2. As depicted, the policy implementation module 215-a may include an action blocking module 405, an exonerating module 410, a security action module 415, and a bypassing module 420.

The action blocking module 405 may block an action from being performed during the monitoring period after the action had triggered either the broad policy and/or at least one of the sub-policies. In some cases, the action blocking module 405 may cause the blocked action to be included in a list of blocked actions to modify the broad policy. As a result, the broad policy may be modified to exclude the blocked action. In some cases, the action blocking module 405 is triggered in response to receiving a notification, such as a notification from the threat notification module 310 depicted in FIG. 3.

The exonerating module 410 may allow an action to be performed during the monitoring period after the action had triggered either the broad policy and/or at least one of the sub-policies. In some cases, the exonerating module 410 may cause the allowed action to be included in a list of allowed actions to modify the broad policy. As a result, the broad policy may be modified to allow the exonerated action. In some cases, the exonerating module 405 is triggered in response to receiving a notification, such as a notification from the false positive classifying module 315 depicted in FIG. 3.

The security action module 415 may perform actions that are responsive to determining that a file in the computing device likely includes some type of malware. The security action module 415 may cause at least some of the other modules depicted in FIGS. 2-4 or other types of modules to activate to protect the computing device.

The bypassing module 420 may allow an exonerated action to bypass the implementation of the broad policy on the computing device. In such an example, the exonerated action may not trigger the broad policy after subsequent action requests.

Figure 5:
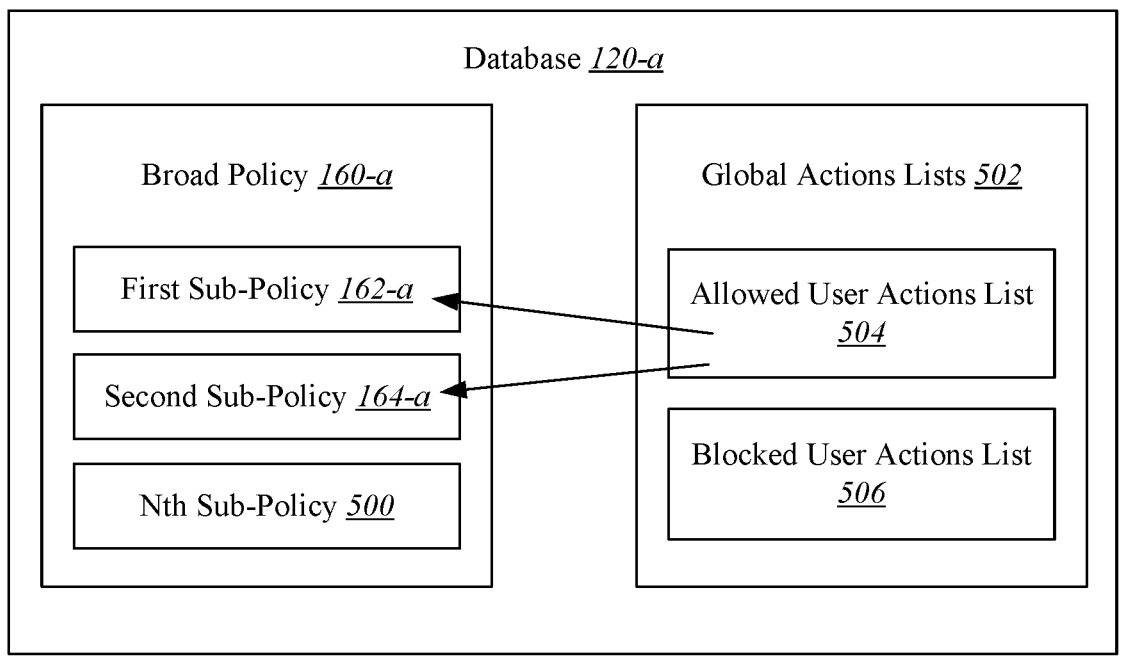
FIG. 5 is a block diagram illustrating an example of allowed and block sub-policies under a broad policy.

FIG. 5 depicts a database 120-a. An example of database 120-a may be the database 160 depicted in FIG. 1. Database 160-a contains a broad policy 160-a, a first sub-policy 162-a, a second sub-policy 164-a, and a Nth sub-policy 500. Examples of the first sub-policy 162-a may include the first sub-policy 162 depicted in FIG. 1, and examples of the second sub-policy 164-a may include the second sub-policy 164 depicted in FIG. 1.

The database 120-a may also include global actions lists 502, which include an allowed user actions list 504 and a blocked user actions list 506. The sub-policies 162-a, 164-a, and 500 may be modified by the global actions lists as certain user actions are classified as false positives and blocked actions. Thus, the broad policy may be narrowly tailored to exclude just those actions that are likely to be malicious while allowing legitimate user requests.

Figure 6:
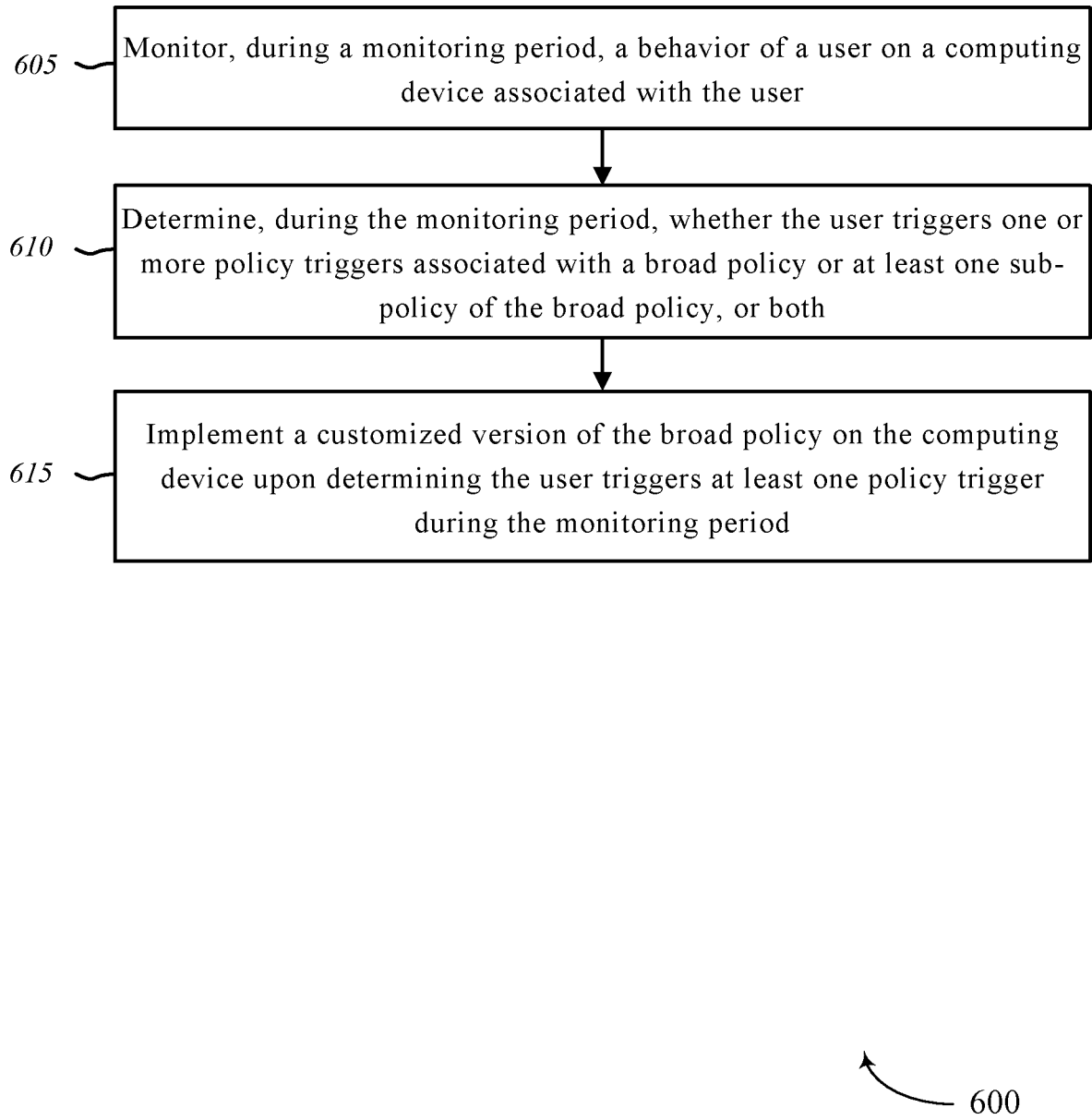
FIG. 6 is a flow diagram illustrating one embodiment of a method for implementing adaptive policy based computer security.

FIG. 6 is a flow diagram illustrating one embodiment of a method 600 for implementing adaptive policy based computer security. In some configurations, the method 600 may be implemented by the adaptive policy module 145 illustrated in FIG. 1 or 2. In some configurations, the method 600 may be implemented in conjunction with the application 140 and/or the user interface 135 illustrated in FIG. 1.

At block 605, the method 600 may include monitoring, during a monitoring period, a behavior of a user on a computing device associated with the user. The user may be a program running on the computing device, a program accessing the computing device, or an individual giving commands to the computing device through a user interface of the computing device. The monitoring period may be any appropriate type period. In some cases, the monitoring period is a 30 day period or another length of time.

Monitoring may include keeping a record of at least some of the activity that is performed on the computing device, tracking at least some of the files accessed on the computing device, tracking at least some of the data modified on the computing device during the monitoring period, tracking the number of requests made during the monitoring period, recording the results of the requested actions during the monitoring period, associating timestamps with at least some of the recorded items, performing other monitoring activities, or combinations thereof. In some cases, a record is tracked of which users performed which types of actions.

At block 610, the method 600 may include determining, during the monitoring period, whether the user triggers one or more policy triggers associated with a broad policy or at least one sub-policy of the broad policy, or both. In some examples, the broad policy includes multiple sub-polies that make up the broad policy. In other examples, the broad policy is correlated with the sub-policy, but is independent of the sub-policies.

An example of a broad policy may include blocking the user of macros in Office documents. An example of a sub-policy correlated to the broad policy may include blocking just those macros that are written by certain programs, blocking just those macros that are associated with particular type of files, blocking just those macros that perform a particular type of function, allowing all macros that are written by a specific administrator, executing all macros that are requested to be executed by a particular user, other types of sub-policies, or combinations thereof.

At block 615, the method 600 may include implementing a customized version of the broad policy on the computing device upon determining the user triggers at least one policy trigger during the monitoring period. In some examples, the customized version of the broad policy may be modified as requested actions are analyzed during the monitoring period and are either blocked or exonerated.

An example of a blocked requested action may include those actions that trigger a sub-policy. In response to triggering the sub-policy, the requested action that trigged that sub-policy may be analyzed to determine whether the requested action poses a security threat. In some cases, those requested actions that pose a security threat may be malicious actions that are intended to harm the computing device. In other examples, the requested actions that pose a security threat may include innocently intended actions, but that may nonetheless pose a security risk to the computing device. In response to determining that these actions pose a security risk, the requested action is included in a list of actions to be blocked. This list of blocked actions may be made up one or more of the sub-policies for the broad policy.

An example of an exonerated requested action may include those actions that trigger a sub-policy. In response to triggering the sub-policy, the requested action that trigged that sub-policy may be analyzed to determine whether the requested action poses a security threat. In some cases, those requested actions are considered to be non-threatening. In response to determining that these actions do not pose a security risk, the requested action is included in a list of actions to be allowed. This list of allowed actions may be made up one or more of the sub-policies for the broad policy.

Figure 7:
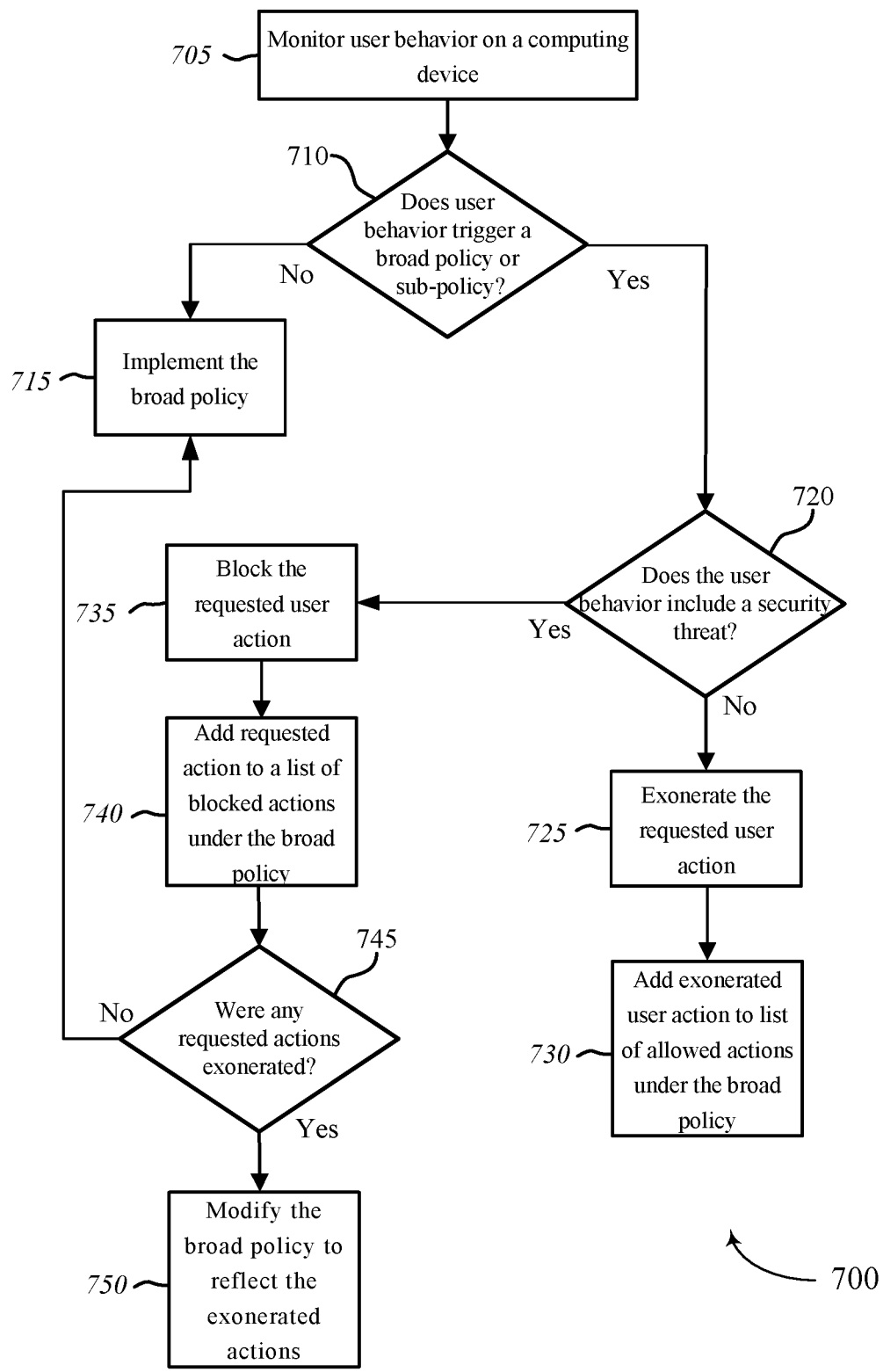
FIG. 7 is a flow diagram illustrating one embodiment of a method for implementing adaptive policy based computer security.

FIG. 7 is a flow diagram illustrating one embodiment of a method 700 for implementing adaptive policy based computer security. In some configurations, the method 700 may be implemented by the adaptive policy module 145 illustrated in FIG. 1 or 2. In some configurations, the method 700 may be implemented in conjunction with the application 140 and/or the user interface 135 illustrated in FIG. 1.

At block 705, the method 700 may include monitoring user behavior on a computing device. At block 710, the method may include determining whether the user behavior triggers a broad policy or a sub-policy. If the user's behavior does not trigger either a broad policy or a sub-policy during the monitoring period, the method 700 may include implementing 715 the broad policy after the monitoring period is completed. In this situation, none of the user behavior triggered the policies, thus all of the user's legitimate requested actions were allowed to be performed. As a result, the broad policy may not be so broad as to exclude the legitimate actions that were performed during the monitoring period. Consequently, the malicious and/or disallowed activity targeted by the broad policy can still be blocked while still allowing the legitimate uses from the users.

If the user behavior triggers either the broad policy or at least one of the sub-policies, then the method 700 may include determining 720 whether the user behavior includes a security threat. If the user behavior does not include a security threat, then the method 700 may include exonerating 725 the requested user action and adding 730 the exonerated user action to a list of allowed actions under the broad policy.

If the triggered user action does have a security threat, then the method 700 may include blocking 735 the requested user action. The method 700 may also include adding 740 the requested action to a list of blocked actions under the broad policy.

The method 700 may also include determining 745 whether any requested actions were exonerated during the monitoring period in addition to the blocked action. If there were exonerated actions during the monitoring period, then the method 700 may include modifying 750 the broad policy to reflect the exonerated actions. But, if no requested user actions were exonerated during the monitoring period, then the method 700 may include implementing 715 the broad policy since there were no false positives.

Figure 8:
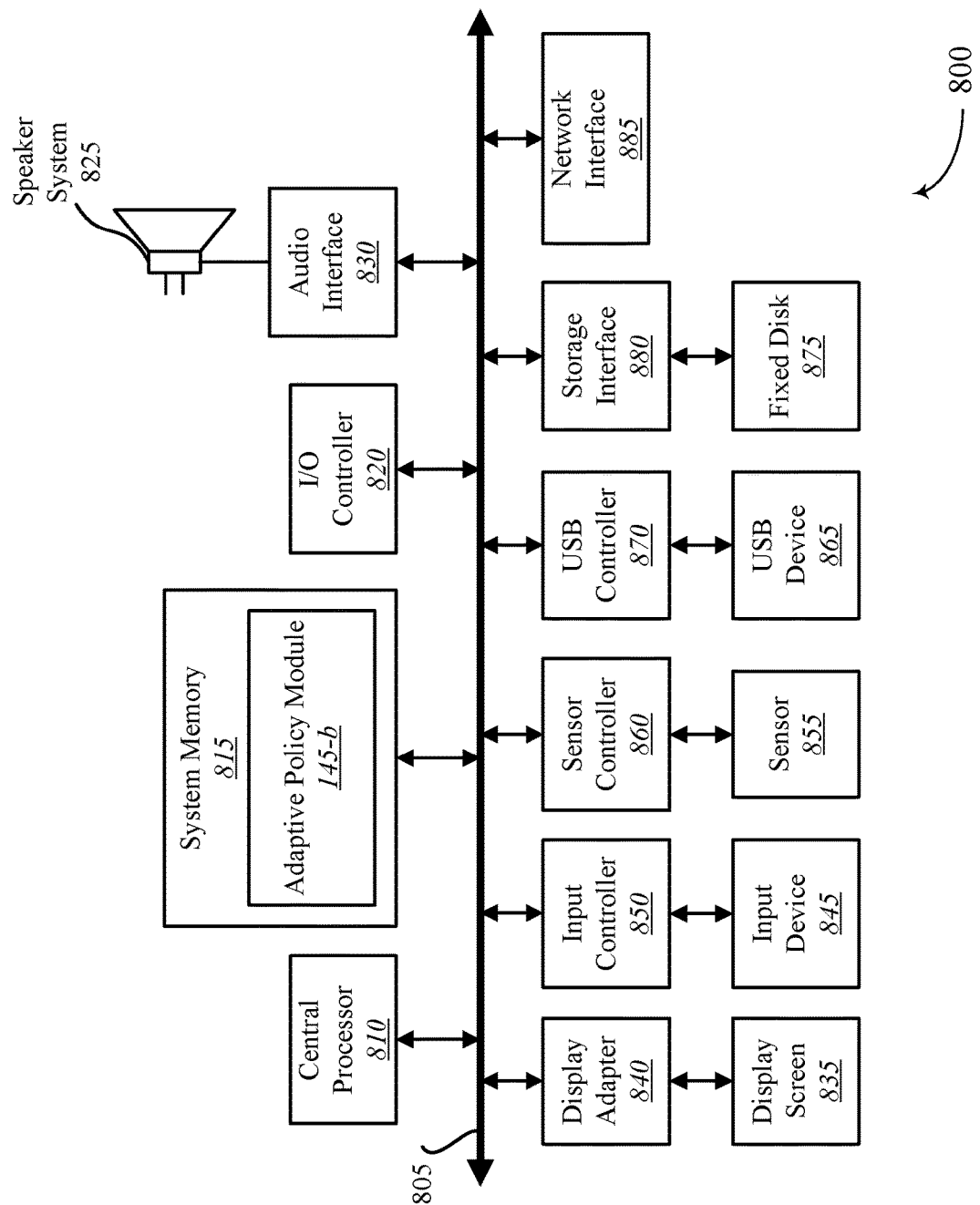
FIG. 8 depicts a block diagram of an example of a computer system suitable for implementing the present systems and methods.

FIG. 8 depicts a block diagram of a computing device 800 suitable for implementing the present systems and methods. The device 800 may be an example of device 105, and/or server 110 illustrated in FIG. 1. In one configuration, device 800 includes a bus 805 which interconnects major subsystems of device 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the adaptive policy module 145-*b* to implement the present systems and methods may be stored within the system memory 815. Applications (e.g., application 140) resident with device 800 are generally stored on and accessed via a non-transitory computer readable medium, such as a hard disk drive (e.g., fixed disk 875) or other storage medium. Additionally, applications can be in the form of electronic signals modulated in accordance with the application and data communication technology when accessed via interface 885.

Storage interface 880, as with the other storage interfaces of device 800, can connect to a standard computer readable medium for storage and/or retrieval of information, such as a fixed disk drive 875. Fixed disk drive 875 may be a part of device 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 800 wirelessly via network interface 885.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 815 or fixed disk 875. The operating system provided on device 800 may be iOS®, ANDROID® MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 800 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 885 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 820 may operate in conjunction with network interface 885 and/or storage interface 880. The network interface 885 may enable system 800 with the ability to communicate with client devices (e.g., device 105 of FIG. 1), and/or other devices over the network 115 of FIG. 1. Network interface 885 may provide wired and/or wireless network connections. In some cases, network interface 885 may include an Ethernet adapter or Fibre Channel adapter. Storage interface 880 may enable system 800 to access one or more data storage devices. The one or more data storage devices may include two or more data tiers each. The storage interface 880 may include one or more of an Ethernet adapter, a Fibre Channel adapter, Fibre Channel Protocol (FCP) adapter, a SCSI adapter, and iSCSI protocol adapter.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses.

Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A computer-implemented method for implementing adaptive policy based computer security, the method being performed by one or more computing devices, each comprising one or more processors, the method comprising:
   initiating a monitoring period for analyzing user behavior associated with a plurality of policies for interacting with a computing device associated with a user;
   monitoring, during the monitoring period, a behavior of the user on the computing device associated with the user, the behavior comprising a requested action of the user;
   determining, during the monitoring period, whether the requested action of the user triggers one or more policy triggers associated with a broad policy or at least one sub-policy of the broad policy, or both;
   implementing the broad policy on the computing device upon determining the requested action of the user does not trigger any of the one or more policy triggers;
   upon determining the requested action of the user triggers at least one policy trigger during the monitoring period:
   determining whether the requested action comprises a security threat;
   upon determining that the requested action of the user comprises no security threat, bypassing implementation of the broad policy on the computing device and assigning the requested action to the list of allowed actions; and
   upon determining that the requested action of the user comprises the security threat, performing a security action, the security action including assigning the requested action of the user to the list of blocked actions, modifying, after the monitoring period, the broad policy based at least in part on assigning the requested action of the user to the list of blocked actions, and implementing the modified version of the broad policy on the computing device after the monitoring period.

2. The method of claim 1, comprising:
   triggering at least one of the policy triggers during the monitoring period based at least in part on the requested action of the user.

3. The method of claim 2, wherein adding the requested action customizes the broad policy to the computing device of the user.

4. The method of claim 2, comprising:
   upon determining that the requested action comprises no security threat, implementing the broad policy on the computing device and adding the requested action of the user to the list of allowed actions under the implemented broad policy.

5. The method of claim 2, comprising:
   upon determining that the requested action comprises no security threat, classifying the requested action of the user as a false positive of the at least one policy trigger.

6. The method of claim 2, comprising:
   upon determining that the requested action of the user comprises the security threat, performing a security action, performing the security action including implementing the broad policy on the computing device, generating a notification indicating the security threat and implementation of the broad policy on the computing device, and sending the notification to an administrator.

7. The method of claim 2, comprising:
   upon determining that the requested action of the user comprises no security threat, exonerating the requested action and adding the exonerated action to a global list of allowed actions.

8. The method of claim 1, wherein the modified version of the broad policy is modified based at least in part on an aspect of at least one policy trigger triggered by the user.

9. A computing device configured for implementing adaptive policy based computer security, comprising:
   a processor;
   memory in electronic communication with the processor, wherein the memory stores computer executable instructions that when executed by the processor cause the processor to perform the steps of:
   initiating a monitoring period for analyzing user behavior associated with a plurality of policies for interacting with a computing device associated with a user;
   monitoring, during the monitoring period, a behavior of the user on the computing device associated with the user, the behavior comprising a requested action of the user;
   determining, during the monitoring period, whether the requested action of the user triggers one or more policy triggers associated with a broad policy or at least one sub-policy of the broad policy, or both;
   implementing the broad policy on the computing device upon determining the requested action of the user does not trigger any of the one or more policy triggers;
   upon determining the requested action of the user triggers at least one policy trigger during the monitoring period;
   determining whether the requested action comprises a security threat;
   upon determining that the requested action of the user comprises no security threat, bypassing implementation of the broad policy on the computing device and assigning the requested action to the list of allowed actions; and
   upon determining that the requested action of the user comprises the security threat, performing a security action, the security action including assigning the requested action of the user to the list of blocked actions, modifying, after the monitoring period, the broad policy based at least in part on assigning the requested action of the user to the list of blocked actions, and implementing the modified version of the broad policy on the computing device after the monitoring period.

10. The computing device of claim 9, wherein the instructions executed by the processor cause the processor to perform the steps of:
    triggering at least one of the policy triggers during the monitoring period based at least in part on the requested action of the user.

11. The computing device of claim 10, wherein adding the requested action customizes the broad policy to the computing device of the user.

12. The computing device of claim 10, wherein the instructions executed by the processor cause the processor to perform the steps of:
    upon determining that the requested action comprises no security threat, implementing the broad policy on the computing device and adding the requested action of the user to the list of allowed actions under the implemented broad policy.

13. The computing device of claim 10, wherein the instructions executed by the processor cause the processor to perform the steps of:
   upon determining that the requested action comprises no security threat, classifying the requested action of the user as a false positive of the at least one policy trigger.

14. The computing device of claim 10, wherein the instructions executed by the processor cause the processor to perform the steps of:
   upon determining that the requested action of the user comprises the security threat, performing a security action, performing the security action including implementing the broad policy on the computing device, generating a notification indicating the security threat and implementation of the broad policy on the computing device, and sending the notification to an administrator.

15. The computing device of claim 10, wherein the instructions executed by the processor cause the processor to perform the steps of:
   upon determining that the requested action of the user comprises no security threat, exonerating the requested action and adding the exonerated action to a global list of allowed actions.

16. A non-transitory computer-readable storage medium storing computer executable instructions that when executed by a processor cause the processor to perform the steps of:
   initiating a monitoring period for analyzing user behavior associated with a plurality of policies for interacting with a computing device associated with a user;
   monitoring, during the monitoring period, a behavior of the user on the computing device associated with the user, the behavior comprising a requested action of the user;
   determining, during the monitoring period, whether the requested action of the user triggers one or more policy triggers associated with a broad policy or at least one sub-policy of the broad policy, or both;
   implementing the broad policy on the computing device upon determining the requested action of the user does not trigger any of the one or more policy triggers;
   upon determining the requested action of the user triggers at least one policy trigger during the monitoring period;
   determining whether the requested action comprises a security threat;
   upon determining that the requested action of the user comprises no security threat, bypassing implementation of the broad policy on the computing device and assigning the requested action to the list of allowed actions; and
   upon determining that the requested action of the user comprises the security threat, performing a security action, the security action including assigning the requested action of the user to the list of blocked actions, modifying, after the monitoring period, the broad policy based at least in part on assigning the requested action of the user to the list of blocked actions, and implementing the modified version of the broad policy on the computing device after the monitoring period.

* * * * *